United States Patent [19]
Hadnagy

[11] 3,942,082
[45] Mar. 2, 1976

[54] MULTI-LINE CHEMICAL INJECTION SYSTEM

[76] Inventor: Thomas D. Hadnagy, 17 Briar Lane, Roslyn Heights, N.Y. 11577

[22] Filed: June 24, 1974

[21] Appl. No.: 482,432

[52] U.S. Cl. .................. 318/51; 318/112; 318/487; 307/141.4; 307/141.8
[51] Int. Cl.² .......................................... H05B 3/02
[58] Field of Search .............. 318/34, 51, 11.2, 486, 318/487; 307/141.4, 141.8

[56] References Cited
UNITED STATES PATENTS

| | | | |
|---|---|---|---|
| 2,475,425 | 7/1949 | Duclos et al. | 318/51 X |
| 2,602,446 | 7/1952 | Glass et al. | 318/486 X |
| 3,198,987 | 8/1965 | Brown | 318/486 X |
| 3,496,337 | 2/1970 | Voglesonger | 318/486 X |

*Primary Examiner*—B. Dobeck
*Attorney, Agent, or Firm*—Kenneth S. Goldfarb

[57] ABSTRACT

A multi-line chemical injection system for injecting chemicals into two or more independent systems including a pressure tank, a pump to supply chemicals to the pressure tank, a pressure control switch to regulate the pressure within the pressure tank and a plurality of cam operated solenoid valves to regulate chemical injection from the pressure tank.

2 Claims, 2 Drawing Figures

MULTI-LINE CHEMICAL INJECTION SYSTEM

BACKGROUND OF THE INVENTION

1. Field of the Invention

This invention relates to a chemical injection system. More specifically, this invention provides an alternating current electro-mechanical chemical injection system that regulates the injection of chemicals from a pressure tank into two or more independent chemical systems.

2. Description of the Prior Art

This invention is related to my previously filed application for a Chemical Injection System, Ser. No. 293,944 filed on Oct. 2, 1972. In the aforementioned application, a chemical injection system was described for injectinig chemicals from a reservoir into a single line, such as an oil line. The object of injecting chemicals into a line was accomplished by a combination of a pressurized fluid reservoir; means means for supplying fluids to the reservoir; means for regulating pressure of the reservoir; and means for controlling fluid injection from the reservoir. The means for supplying fluids to the reservoir was described as being preferably a motor driven pump. The means for regulating pressure of the pressurized fluid reservoir was described as being preferably a pressure switch including contacts, or the like, to control the flow of alternating current permitted to pass, and thereby stopping the pump motor at a particular desired pressure. In a preferred embodiment of the aforementioned invention, between the pump motor and pressure switch, there are contacts in the pressure switch controlling the flow of alternating current to operate the motor at a pressure range of 20 psi to 40 psi within the pressurized fluid reservoir, or pressure tank.

The chemical injection system described in the aforementioned application is limited to the injection of chemicals into a single line.

SUMMARY OF THE INVENTION

The present invention accomplishes its desired object, the injection of chemicals into two or more lines, by a combination of a pressurized fluid reservoir; means for supplying fluids to the reservoir; means for regulating pressure in the reservoir; and means for controlling fluid injection from the reservoir. The means for controlling fluid injection from the reservoir includes a plurality of cams driven by a cam motor and a plurality of control relays controlling a plurality of solenoid operated valves. The means for supplying fluids to the reservoir is preferably a motor driven pump. The means for regulating pressure of the pressurized fluid reservoir is preferably a pressure switch including contacts, or the like, to control the flow of alternating current permitted to pass, and thereby stopping the pump motor at a particular desired pressure. In a preferred embodiment, between the pump motor and pressure switch, there are contacts in the pressure switch controlling the flow of alternating current to operate the motor at a pressure range of 20 psi to 40 psi within the pressurized fluid reservoir, or pressure tank.

It is another object of the present invention to provide for automatic venting of pressure from the fluid reservoir and automatic return of chemicals from the fluid reservoir to a chemical supply reservoir.

It is another object of the invention to provide for an automatic cut-off for the pump motor and cam motor when the source for chemicals that supplies the fluid reservoir is dry.

These, together with various ancillary objects and features which will become apparent to those skilled in the art as the following description proceeds, are attained by this chemical injection system and circuitry, a preferred embodiment being shown in the accompanying drawings, by way of example only, wherein:

Figure 1:
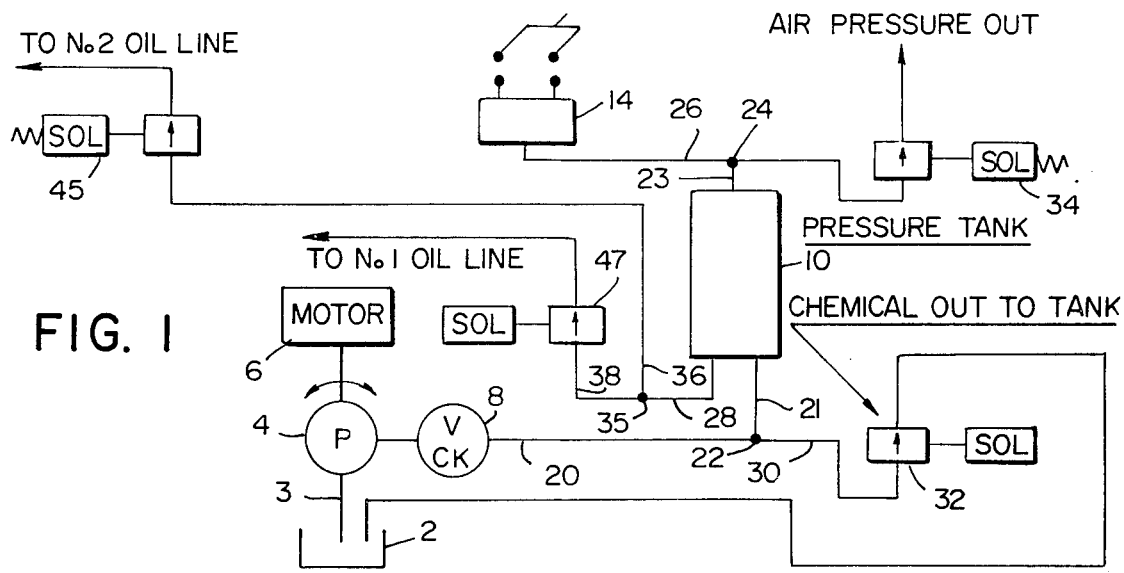
FIG. 1 is a schematic diagram illustrating a flow scheme for the preferred embodiment of the multi-line chemical injection system.

Referring in detail now to the drawings, wherein like reference numerals designate identical parts throughout the views, and in particular to FIG. 1, there is seen a motor 6 driving Tee a pump 4 taking suction on a chemical supply reservoir 2 via conduit 3. Pump 4 discharges chemicals through a check valve 8 via conduit 20 to tee joint 22 where chemicals enter a pressure tank 10 through a conduit 21. Tee joint 22 is also connected to conduit 30 on which is provided a solenoid valve 32 and which leads back to the chemical supply reservoir 2. A pressure switch 14 controls the pressure within the pressure tank 10 by chemical fluid pressure through conduit 23, tee joint 24 and conduit 26. Also provided on conduit 26 is a solenoid valve 34. Chemicals exit the pressure tank 10 through conduit 28 which leads to tee joint 35 and conduits 36 and 38. Injection of chemicals is regulated by solenoid 45 and 47 which are located on conduits 36 and 38, respectively.

Figure 2:
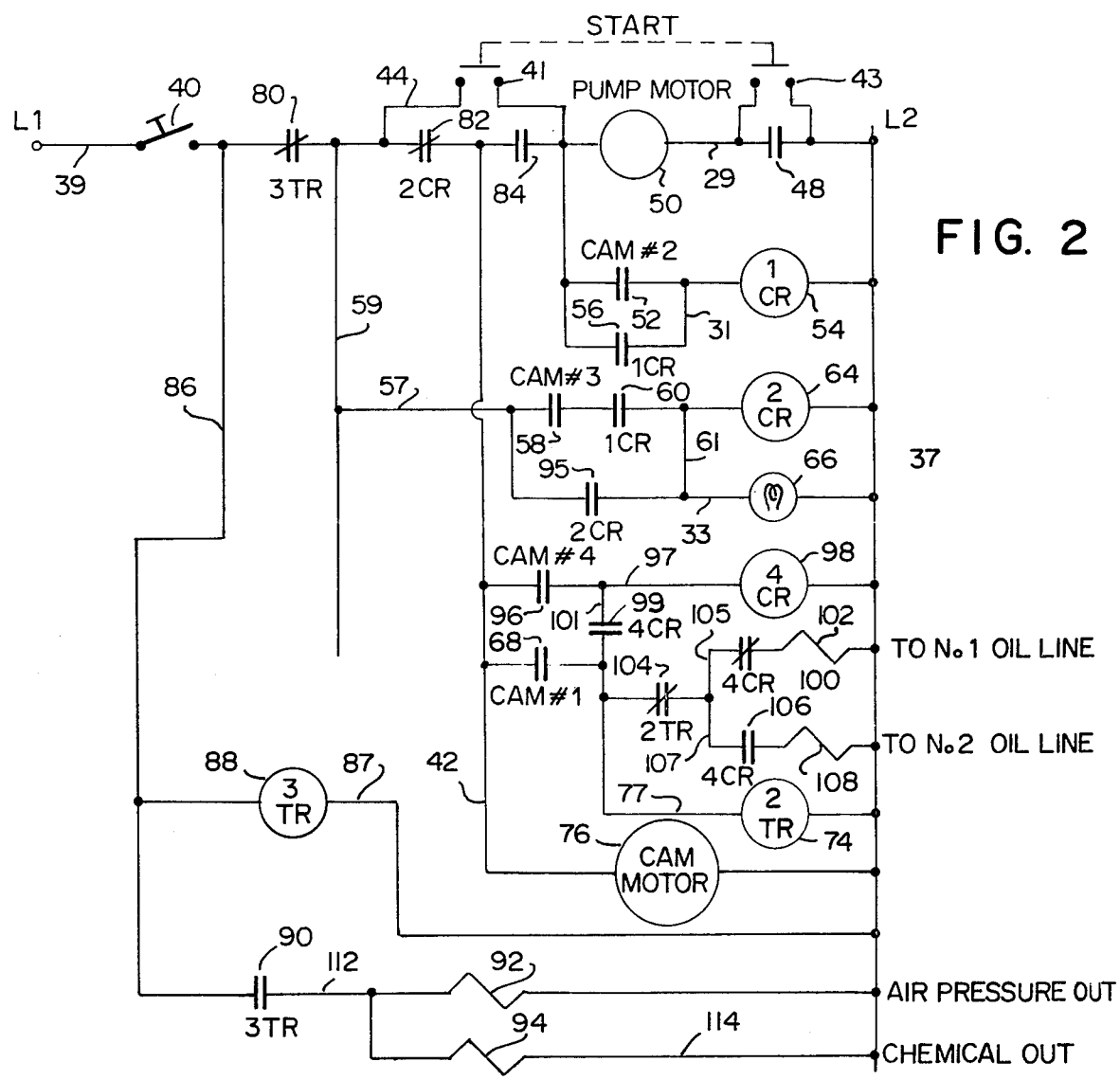
FIG. 2 is a schematic wiring diagram illustrating the circuitry for the flow scheme of the invention.

As shown in the circuit diagram of FIG. 2, there are provided a pair of lines 39 and 37, to which are applied a continuous alternating current from a power source. A cam motor 76 is connected to the power source lines 37 and 39 via line 42. Also connected in series with the source are toggle switch 40, normally closed contact 82 of the control relay 64 and normally closed contact 80 of the timer 88. A solenoid valve circuit includes normally open contacts 68, time relay normally closed contact 104 operated by timer 74. Timer 74 is connected via conductor 77 from inbetween normally open contacts 68 and normally closed contacts 104 to line 37. Normally closed contact 100 and solenoid valve coil 102 are connected, in order stated, in series via conductor 105 which is connected between normally closed contact 104 and line 37. Normally open contact 106 and solenoid valve coil 108 are connected, in order stated, in series via conductor 107 which is connected between normally closed contact 104 and line 37. A first control circuit across the source includes normally open contacts 58 and 60 and control relay 74 and are connected in series in the order stated by conductors 57 and 59 from between normally closed contacts 80 and normally closed contacts 82 to the solenoid valve circuit side of source. Normally open contacts 95 and light 66 are connected in order stated in series via line 33 across normally open contacts 58, 60 and control relay 64 to solenoid valve circuit side of source. Conductor 61 connects from between light 66 and normally open contacts 95 to between control relay 64 and normally open contacts 60 of control relay 54.

A second control circuit is shown through line 44 which includes push button double contact 41, contacts 52, and control relay 54 connected in order stated in series from between normally closed contacts 80, and normally closed contacts 82, to the first control circuit side and across the source. Contacts 56 are connected across the contacts 52 via line 31.

A pressure control circuit is shown via line 29 and includes pressure switch contacts 84, pump motor 50, and contacts 48 connected in series in the order stated from between normally closed contacts 82 of control relay 64 which are normally closed and the solenoid valve circuit across the power source and additionally includes two contact push button switch 43 connected across contacts 48.

A third control circuit includes timer 88 connected via conductors 86 and 87 from inbetween toggle switch 40 and normally closed contacts 80 across the source. Normally open contacts 90 of the timer 88 and solenoid coil 92 are connected in series, in order stated, via conductor 112 across timer 88. Solenoid valve coil 94 is connected across solenoid valve coil 92 via conductor 114 from inbetween normally open contact 90 and solenoid valve coil 92 to line 37.

A fourth control circuit includes normally open contacts 96 and relay 98 connected via connector 97 across lines 37 and 42. Normally open contacts 99 of the relay 98 are connected vai conductor 101 from inbetween normally open contacts 96 and relay 98 to inbetween normally open contacts 68 and normally closed contacts 104.

The invention operates by initially closing toggle switch 40, and subsequently pressing push button switches 41 and 43 which immediately starts cam motor 76 and pump motor 50. Switches 41 and 43 are depressed until contacts 84 and 48 close, which occurs at approximately 20 psi within pressure tank 10 and switches 41 and 43 may subsequently be released. When the pressure within the pressure tank 10 has reached approximately 40 psi, the pressure switch 14 breaks contacts 84 and 48 and stops the pump motor 50. However, pressure switch 14 has no control for stopping cam motor 76 which continuously runs after pump motor 50 stops.

Cam motor 76 operates cams 52, 58 and 96 which also include contatcs 52, 58, 68 and 96, respectively.

Adjustable timing relay 74 and cams 68 and 96 control the injection of chemicals. This injection can be regulated by manual adjustment of the adjustable timing relay 74. When cam 68 disconnects adjustable timing relay 74, the injection of chemicals to the Number 1 oil line ceases. When the adjustable timing relay 74 is closed, chemicals are being injected by valve solenoid 47 which includes normally closed contacts 100 and coil 102.

When contacts 96 are closed, control relay 98 is energized, normally open contacts 99 and 106 are closed and normally closed contacts 100 are opened. Coil 102 is thus disconnected ceasing injection of chemicals into the Number 1 oil line and starting injection of chemicals into the Number 2 oil line by way of coil 108. Contacts 96 are shifted with respect to contacts 68 so that they are not both activated simultaneously.

Cam 52 provides for an automatic cut-off when the chemical supply container is dry. Control relay 54 is normally interlocked. However, when chemical supply container is dry, and cam motor is running, cam 52 which is in parallel with contacts 56, picks up interlocked control relay 54 which is in series with the parallel circuit of cam 52 and contacts 56. Cam 58 which is in series with contacts 60 and in combination with contacts 62, angularly shifts to cam 52 and picks up control relay 64 which becomes interlocked and with contacts 82 disconnects pump motor 50 and cam motor 76. Light 66 goes on and the supply chemical container has to be replaced. Interlocked control relay 64 is disconnected even though toggle switch 40 is still connected. The cycle may subsequently be started over by opening and then closing toggle switch 40 and subsequently pressing start button 41.

Timing relay 88 controls solenoid valve 32, which regulates the flow of chemicals from pressure tank 10 to the chemical supply reservoir 2, and solenoid valve 34 which vents the pressure tank 10.

A latitude of modification, change and substitution is intended in the foregoing disclosure and in some instances some features of the invention will be employed without a corresponding use of other features.

What is claimed is:

1. A control mechanism for regulating the injection of chemicals comprising a cam motor connected to a power source, first normally closed contacts connected in series with said cam motor, a toggle switch connected in series with said first normally closed contacts and said cam motor, a first control circuit including second and third contacts, and a control relay connected in series from between said toggle switch and said first normally closed contacts across said source and having fourth contacts and a light connected in series across said first normally closed contacts, said third contacts, and said control relay, and additionally having a conductor connected from between said light and said fourth contacts to between said control relay and said third contacts, a second control circuit including a first push button switch, fifth contacts, and second control relay connected in series from between said toggle switch and said first normally closed contacts to first control circuit side and across said source, and having sixth contacts connected across said fifth contacts, a pressure control circuit including seventh contacts, a pump motor, eight contacts connected in series from said first normally closed contacts and across said power source, and having a second push button switch connected across said eight contacts, and a solenoid valve circuit including ninth normally open contacts and a control relay connected in series across said cam motor, a parallel circuit combination including tenth normally closed contacts, a first solenoid coil connected in series with said tenth normally closed contacts, a second solenoid coil, eleventh normally open contacts connected in series with said second solenoid coil, with said series combination of said first solenoid coil and said tenth normally closed contacts connected in parallel with said series combination of said second solenoid coil and said eleventh normally open contacts and with said parallel circuit combination connected in series with twelfth normally closed contacts, a time relay connected across said parallel circuit combination and with said twelfth normally closed contacts and thirteenth normally open contacts connected in series to said twelfth normally closed contacts and with said combination of said thirteenth normally open contacts, said twelfth normally closed contacts and said parallel circuit combination connected across said cam motor, and a fourteenth normally open contact connected from between said ninth normally open contacts and said control relay to between said twelfth normally closed contacts and said thirteenth normally open contacts.

2. A control mechanism for regulating the injection of chemicals according to claim 1, including a pressure tank circuit including a second time relay connected across said power source and a solenoid valve circuit including a third solenoid valve coil connected in parallel with a fourth solenoid valve coil, fifteenth normally open contacts connected in series with said third and fourth solenoid valve coils with said solenoid valve circuit connected across said second time relay and, sixteenth normally closed contacts connected in series with said toggle switch.

* * * * *